(12) United States Patent
Cespedes et al.

(10) Patent No.: US 6,907,984 B2
(45) Date of Patent: Jun. 21, 2005

(54) MOTOR MOUNTING CONFIGURATION FOR ROLL OUT TABLE AND METHOD OF RETROFITTING THE SAME

(75) Inventors: John W. Cespedes, Louisville, OH (US); Thomas E. Besco, Navarre, OH (US); Steven R. Harper, Louisville, OH (US); Jeffery A. Smith, Strasburg, OH (US); Joseph A. Trescott, Louisville, OH (US); Timothy F. Hannon, Louisville, OH (US)

(73) Assignee: The Hannon Company, Canton, OH (US)

( * ) Notice: Subject to any disclaimer, the term of this patent is extended or adjusted under 35 U.S.C. 154(b) by 310 days.

(21) Appl. No.: 10/115,326

(22) Filed: Apr. 2, 2002

(65) Prior Publication Data

US 2003/0034230 A1 Feb. 20, 2003

Related U.S. Application Data

(60) Provisional application No. 60/280,881, filed on Apr. 2, 2001.

(51) Int. Cl.$^7$ .............................................. B65D 13/06
(52) U.S. Cl. ....................................... 198/788; 108/20
(58) Field of Search ................................ 198/788, 789, 198/791; 432/190, 191, 236, 246, 227; 29/125, 130, 132; 108/161, 55.3, 20, 21, 22, 67

(56) References Cited

U.S. PATENT DOCUMENTS

| 2,959,077 | A | * | 11/1960 | Heym | ........................ | 198/788 |
| 3,327,837 | A | * | 6/1967 | Covell | ........................ | 198/789 |
| 3,463,297 | A | * | 8/1969 | Morgan | ...................... | 198/791 |
| 5,020,657 | A | * | 6/1991 | Huber | ........................ | 198/788 |
| 6,450,325 | B1 | * | 9/2002 | Devnani | ...................... | 198/788 |

FOREIGN PATENT DOCUMENTS

| EP | 335216 A1 | * | 10/1989 | ............. | F16D/1/10 |
| JP | 57004810 A | * | 1/1982 | ........... | B65G/39/00 |

OTHER PUBLICATIONS

Dodge Couplings Selection Guide.
ProTech Bearing Isolators.

* cited by examiner

*Primary Examiner*—Jose V. Chen
(74) *Attorney, Agent, or Firm*—Zollinger & Burleson Ltd.

(57) ABSTRACT

A motor mounting configuration for a roll out table reduces bearing wear and allows the motor of the roll out table to be quickly removed and reinstalled. A method for retrofitting a roll out table with a motor mount configuration that allows the motor to be quickly removed and reinstalled includes the use of a hold down element. In addition, the retrofit roll out table includes a bearing configuration designed to better withstand the harsh operating environment of the roll out table. Further, the improved roll out table includes a coupling between the motor and the roller shaft that allows for adjustability.

37 Claims, 17 Drawing Sheets

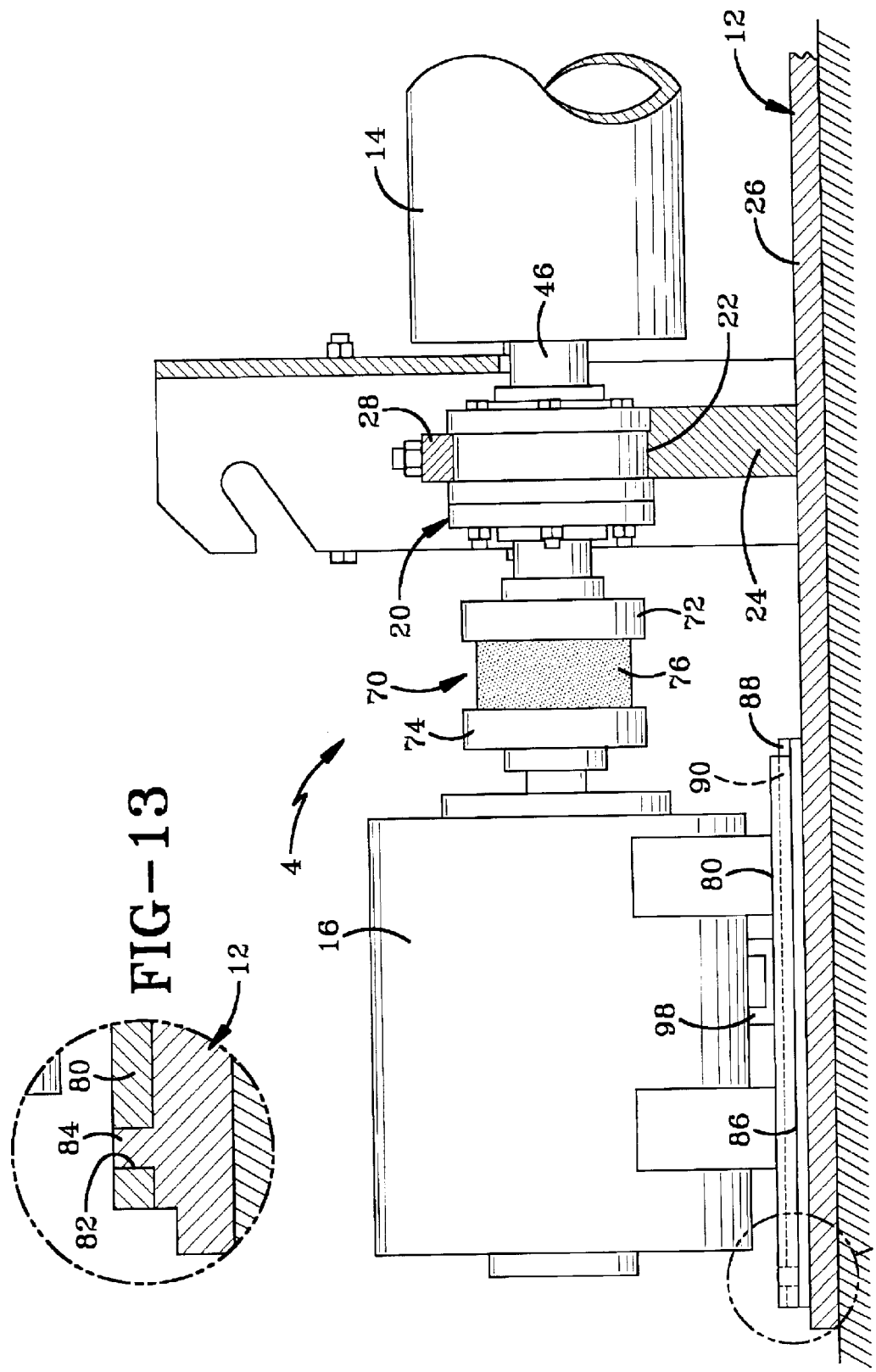

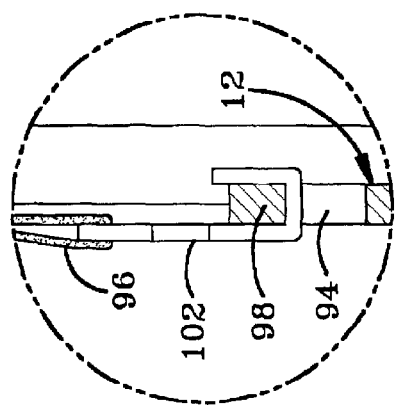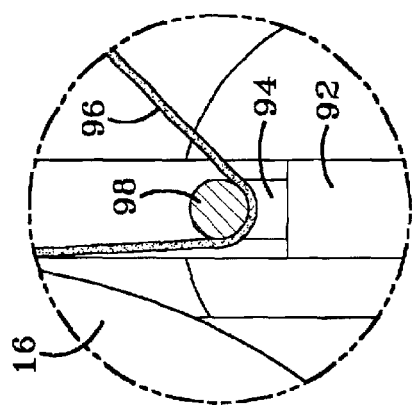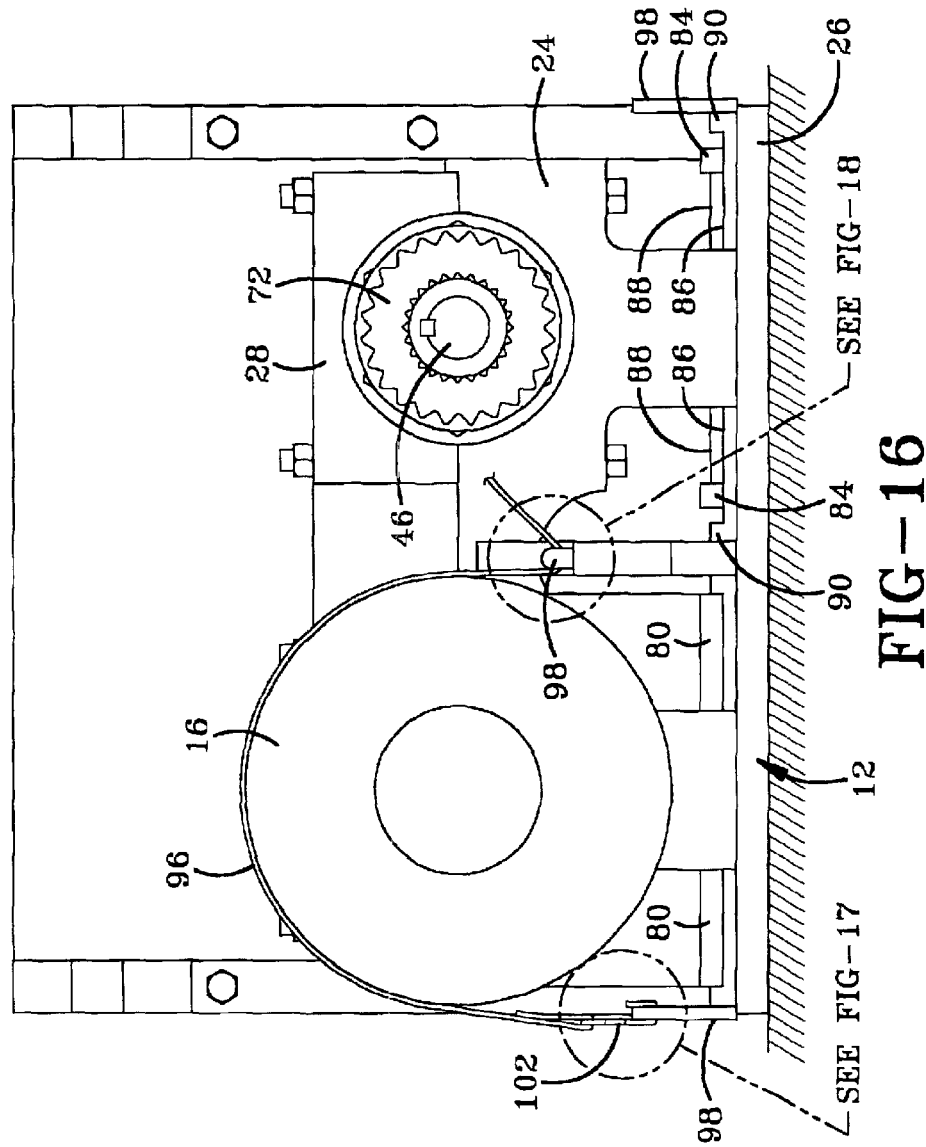

MOTOR MOUNTING CONFIGURATION FOR ROLL OUT TABLE AND METHOD OF RETROFITTING THE SAME

CROSS REFERENCE TO RELATED APPLICATION

This application claims priority from U.S. Provisional Patent Application Ser. No. 60/280,881 filed Apr. 2, 2001; the disclosures of which are incorporated herein by reference.

BACKGROUND OF THE INVENTION

1. Technical Field

This invention generally relates to motor mounting configurations and methods for mounting motors at roll out tables. More particularly, the invention relates to a motor mounting configuration for a roll out table in a steel making facility that allows the motor to be quickly and easily installed and removed. The invention also relates to a method for retrofitting a roll out table with a new motor mounting configuration.

2. Background Information

Powered roll out tables such as the ones used to move steel in steel making facilities include rollers that carry and move the steel and motors that power the roller. The roll out tables are used in steel making facilities in relatively harsh environments such as where hot steel is cooled by water. In this situation, the hot steel member is being moved down the roll out table while cooling water is being poured over the hot steel. The elements of the roll out table are thus constantly exposed to water and heat that causes the parts to wear and rust relatively quickly. Specifically, the bearings that support the rollers of the roll out tables frequently fail causing undesirable down time. To replace the bearings, the maintenance workers must uncouple the motor and typically have the motor replaced or serviced while the motor is disconnected. In addition to the cost of maintaining or replacing the motor and maintaining or replacing the bearings, the disassembly process commonly takes up to three maintenance workers working for at least a few hours to change a motor. In a steel mill, the roll out tables may have hundreds of rollers with at least one of the hundreds of rollers needing maintenance each week. The owners of the roll out tables desire to decrease the frequency of the maintenance and desire to reduce the man hours required to change a roller and a motor.

When roll out tables are assembled, the nuts and bolts used to mount the motors and used to hold the bearings in place are welded together so that maintenance workers must cut away the welds and cut the nuts from the bolts to disassemble the units. All of these connectors must be replaced and rewelded when the motor and bearings are reinstalled. The welding and cutting processes are not desirable because of the working environment and because of accessibility problems for the cutter and the welder. The art desires a mounting configuration that does not require the connectors to be welded and then cut apart.

One attempted solution in the art has been to install grease pumps that constantly supply grease to the bearings. The supply of grease was believed to keep water and dirt out of the bearings and to increase bearing life in order to decrease maintenance. This solution has been unsatisfactory and may result in damaged seals. In addition, the cost of installing the grease pumps and grease lines is undesirable.

BRIEF SUMMARY OF THE INVENTION

The invention generally provides an improved motor mounting configuration. The invention provides a motor mounting configuration for a roll out table that reduces bearing wear and allows the motor of the roll out table to be quickly removed and reinstalled. The invention also provides a method for retrofitting a roll out table with a motor mount configuration that allows the motor to be quickly removed and reinstalled. In addition, the retrofit roll out table includes a bearing configuration designed to better withstand the harsh operating environment of the roll out table. Further, the improved roll out table includes a coupling between the motor and the roller shaft that allows for adjustability.

BRIEF DESCRIPTION OF THE SEVERAL VIEWS OF THE DRAWINGS

FIG. 12 is a view similar to FIG. 11 showing the motor in the installed position.

FIG. 13 is an enlarged view of the encircled portion of FIG. 12.

FIG. 16 is an end view showing the first motor installed on the roll out table.

FIG. 17 is an enlarged view of the encircled portion of FIG. 16.

FIG. 18 is an enlarged view of the encircled portion of FIG. 16.

Similar numbers refer to similar part throughout the specification.

DETAILED DESCRIPTION OF THE INVENTION

Figure 1:
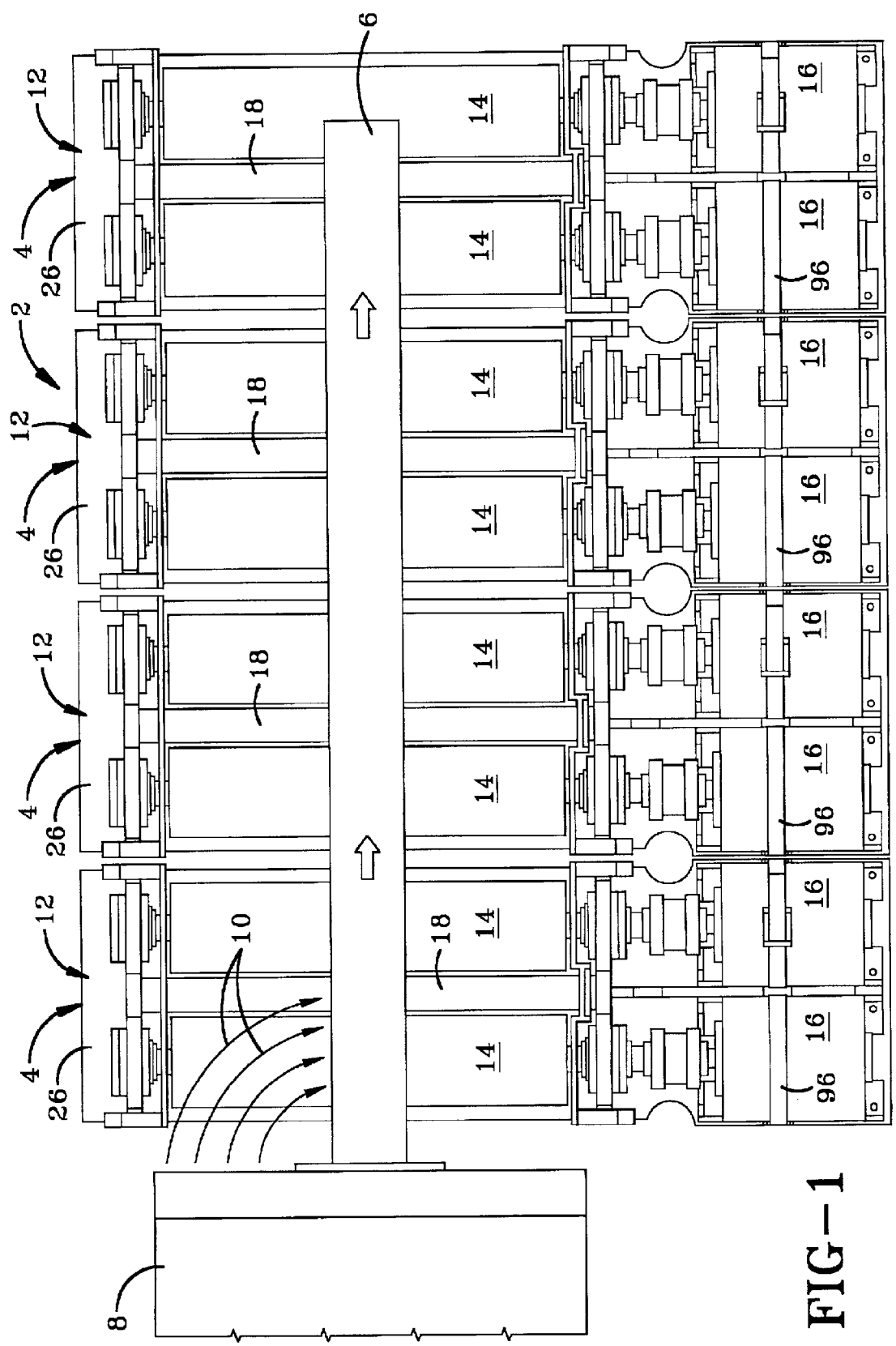
FIG. 1 is a top plan view of a bank of roll out tables showing a piece of steel being moved by the rollers.

FIG. 1 depicts a bank 2 of roll out tables 4 used to transport items such as steel 6 out of a furnace 8 so that the hot steel 6 may be cooled. In a hot mill process, water 10 is poured over the hot steel while the steel is being moved by the roll out tables 2. In a cold mill process, the hot steel is air cooled while it is being rolled out by tables 2.

Each table 4 of bank 2 includes a base 12 that carries at least one roller 14 and at least one motor 16 that drives roller 14. In the embodiment of the invention depicted in the drawings, each table 4 includes two spaced apart, substantially parallel rollers 14 and a motor 16 for each roller 14. An air knife 18 may be disposed between rollers 14 to blow water away from rollers 14 and to remove debris from tables 4.

Each roller 14 is rotatably supported on base 12 by a pair of bearing assemblies 20. Each bearing assembly 20 is supported from below by a seat 22 defined by a lower roller support 24 that extends up from the bottom plate 26 of base 12 at both ends of roller 14. Seat 22 may be curved to match the outer curvature of bearing assembly 20. In other embodiments, seat 22 is not curved and in further embodiments, the outer surface of bearing assemblies is not curved. An upper roller support 28 is bolted over bearing assemblies 20 to lock rollers 14 in place with respect to base 12. Lower roller support 24 may include a shoulder 30 that abuts an inner shoulder 32 defined by bearing assembly 20. Bearing assembly 20 also defines an outer shoulder 34 that abuts the outer edge of the lower roller support 24. Upper roller support 28 fits between shoulders 32 and 34 to prevent bearing assembly 20 from moving toward or away from motor 16.

Each bearing assembly 20 includes a plurality of bearings 40 that ride between inner 42 and outer 44 bearing races. Inner bearing race 42 rides on the shaft 46 of roller 14 abutting a first shoulder 48 on shaft 46. Inner bearing race 42 is held against shoulder 48 by a sleeve 50 that may be keyed to shaft 46.

Outer bearing race 44 is sandwiched between inner 52 and outer 54 housing members of bearing assembly 20. Bolts 56 hold members 52 and 54 together. Bearing assembly 20 further includes seals 58 or bearing isolators that prevent water from entering assembly 20 and prevent grease from exiting assembly 20. One type of seal or bearing isolator 58 that may be used in the invention is a bearing isolator sold under the name ProTech™ sold by J M Clipper of Nacogdoches, Tex.

Slingers 60 are disposed axially outside seals 58 to help sling water and debris away from bearing assembly 20 when rollers 14 are rotating and water is being dumped over table 4.

Each motor 16 is connected to roller 14 by a coupling 70 that provides a range of adjustability so that motor 16 does not have to be perfectly mounted with respect to roller 14. Coupling 70 includes an inner member 72 connected to shaft 46, an outer member 74 connected to motor 16, and an intermediate member 76 disposed between inner member 72 and outer member 74. This type of coupling 70 may be obtained from Dodge Manufacturing Corporation of Indiana or Reliance Electric Industrial Company of Cleveland, Ohio. Other couplings 70 may also be used without departing from the concepts of the present invention. Coupling 70 shown in the drawings has the advantage that it can withstand the harsh operating environment where tables 4 are located while allowing the position of motor 16 to be slightly adjustable with respect to roller 14. Coupling 70 also permits motor 70 to be slid into position as described below. In the past, the shaft of motor 16 included a flange that was bolted directly to a flange connected to shaft 46. The bolts between motor 16 and shaft 14 were typically welded together so that the connector could not be adjusted and a disassembly was difficult.

Each motor 16 includes a motor base 80 configured to be received on a portion of base 12 of table 4. Each motor base 80 defines at least two openings 82 (FIGS. 8 and 13) configured to be slid over retaining studs 84 projecting up from base 12. Studs 84 are positioned so that motor 16 will be aligned with roller 14 and spaced from roller 14 so that coupling 70 will properly fit between roller 14 and motor 16 when studs 84 are received in openings 82. In the embodiment of the invention depicted in the drawings, two studs 84 are used to position motor 16. In other embodiments, different stud configurations and numbers may be used without departing from the concepts of the present invention. The tolerance between the outer diameter of stud 84 and the inner diameter of opening 82 is designed to allow coupling 70 to properly function. In the embodiment depicted in the drawings, studs 84 are located at the back corners of motor 16 farthest from rollers 14 and farthest from coupling 70. Each stud 84 projects upwardly from a mounting pad 86 connected to base 12. Each pad 86 includes a stop 88 on the end of pad 86 facing roller 14. Stop 88 is configured to abut with the front end of base 80 of motor 16 and properly position openings 82 with respect to studs 84. Each pad 86 further includes an edge stop 90 configured to abut the edge of base 80 to longitudinally position base 80 of motor 16.

Base 12 includes a rib 92 extending longitudinally between motor 16. Base 12 further defines three strap openings 94 configured to receive a hold down device in the form of a strap 96 that holds motors 16 in place. Each opening 94 is defined by a tab 98 or rod 98 connected to base 12 or integrally formed therewith.

Figure 2:
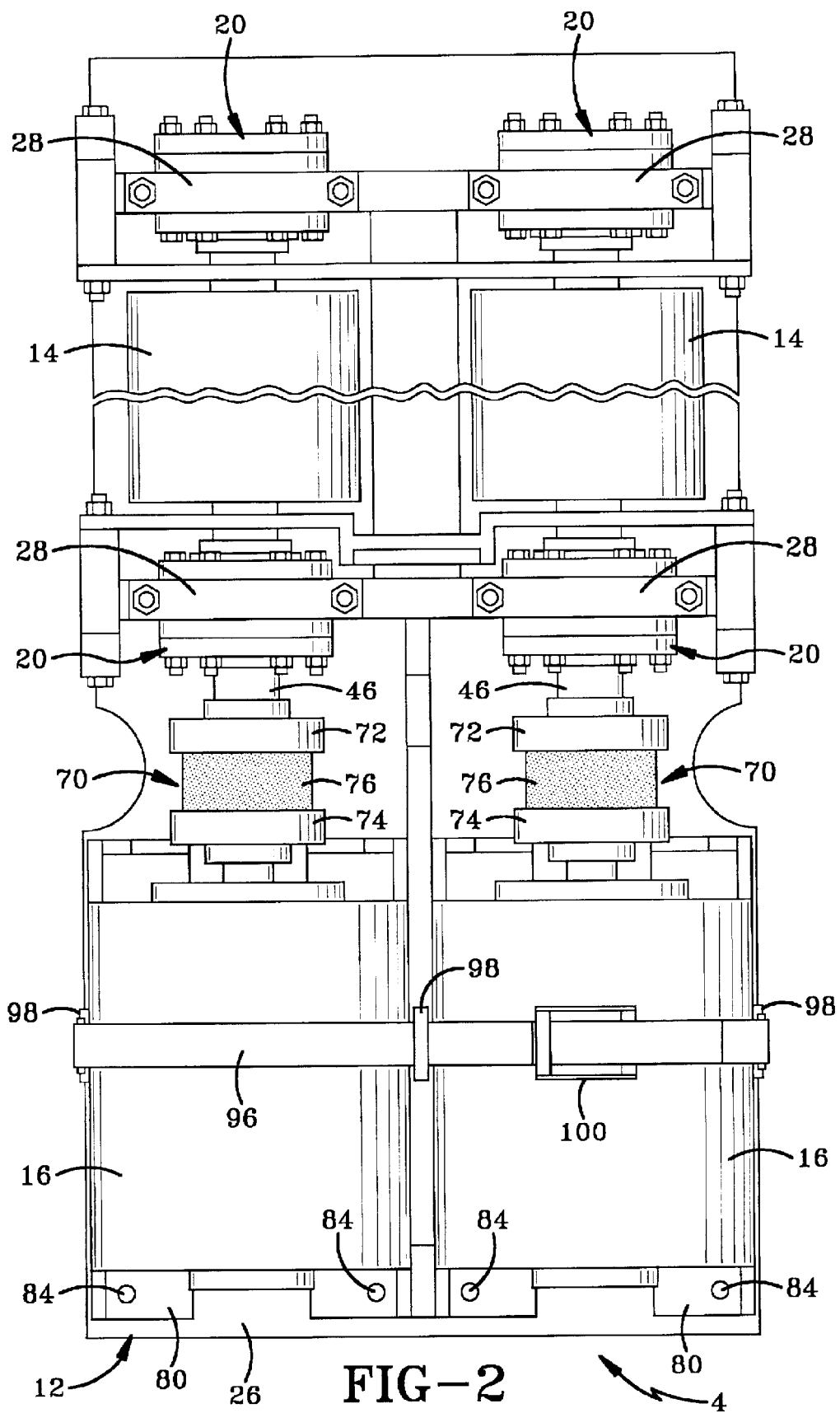
FIG. 2 is a top plan view, with the middle portion broken away, of a single roll out table having two rollers and two motors.
Figure 3:
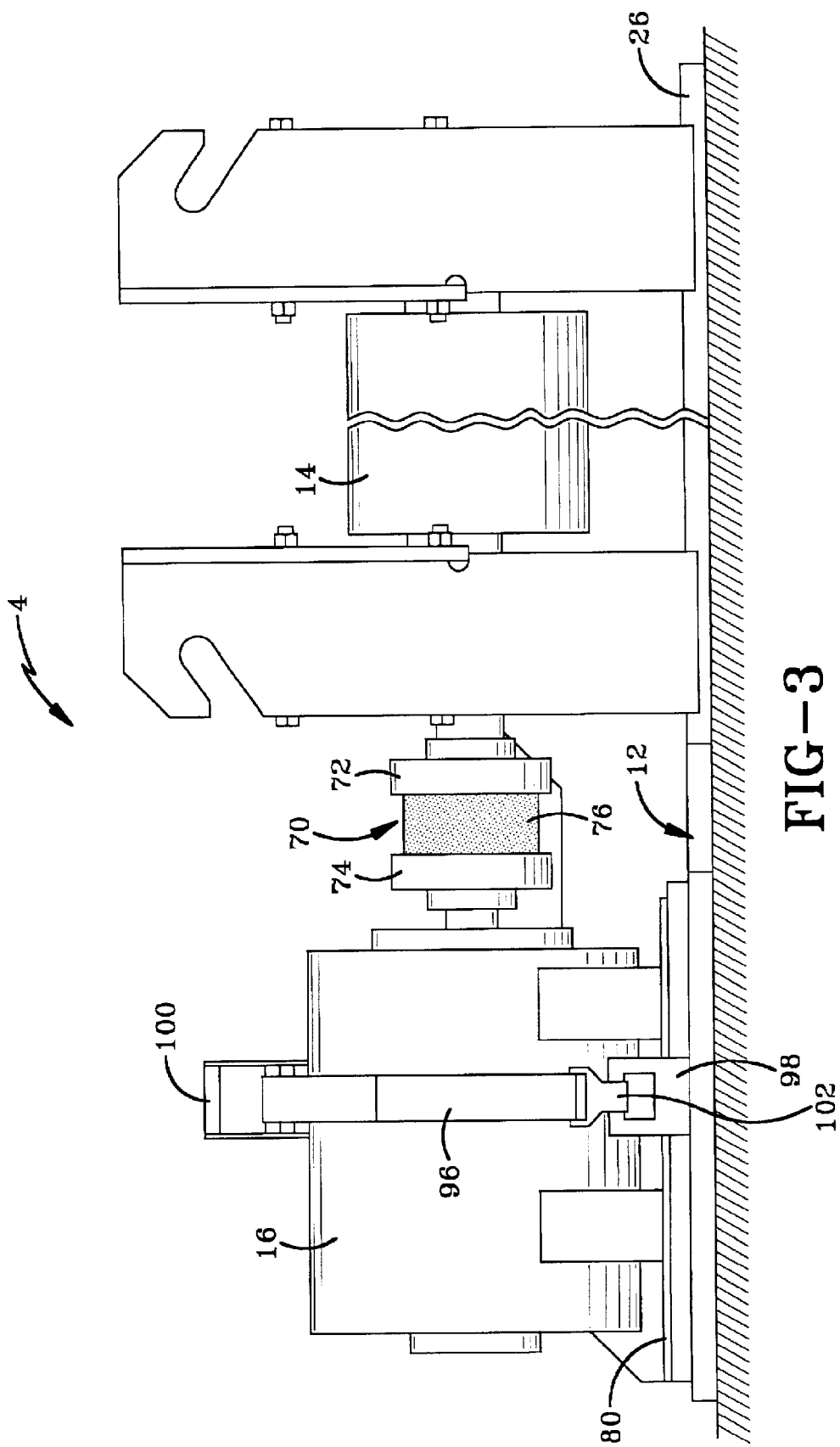
FIG. 3 is a side view of FIG. 2.
Figure 4:
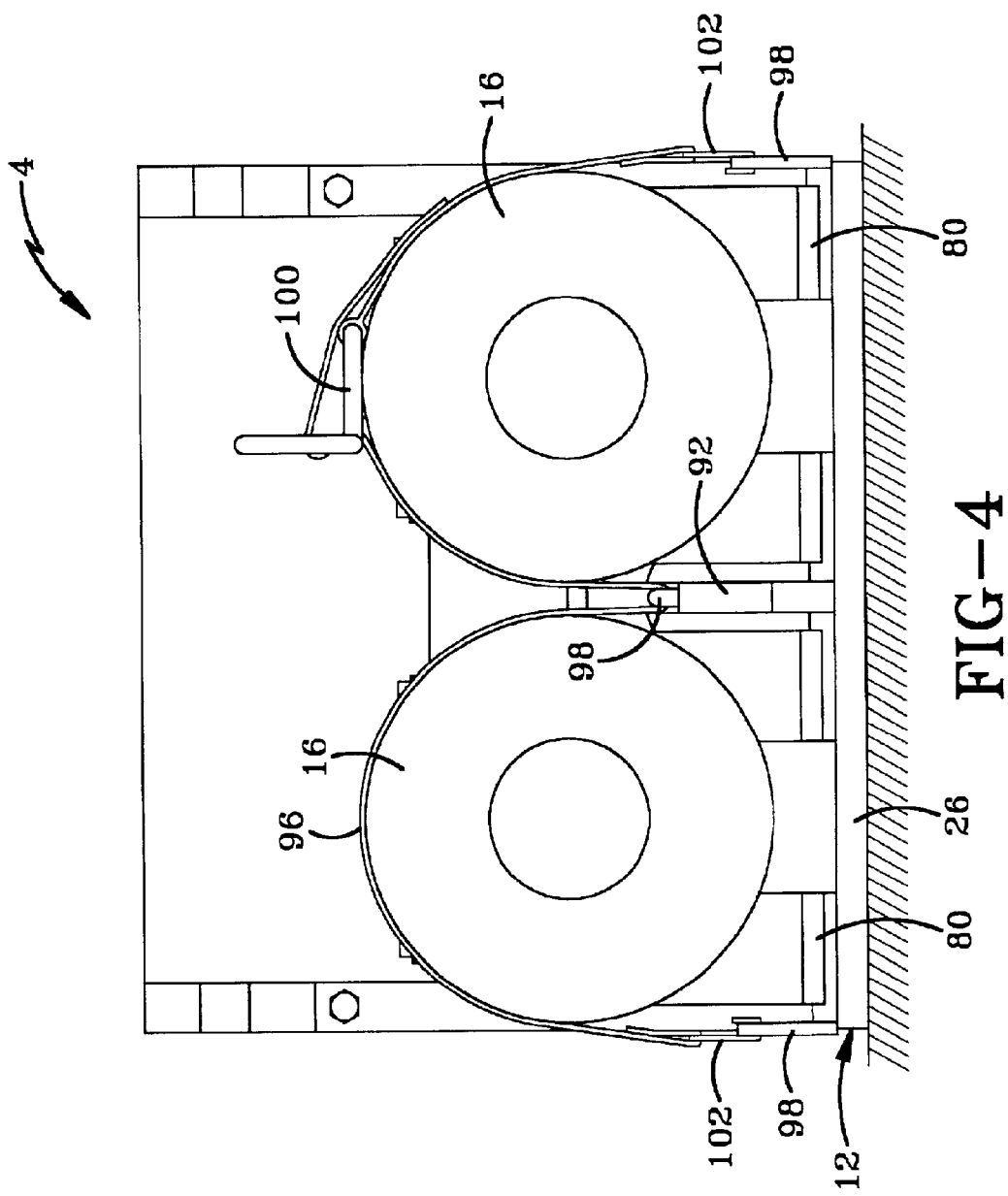
FIG. 4 is an end view of FIG. 2.

The length of each strap 96 is adjustable so that strap 96 may be tightened around motors 16. In one embodiment, strap 96 includes a ratchet 100 configured to adjust the length of strap 96. Strap 96 may also include hooks 102 configured to connect with tabs 98. The members of strap 96 are preferably inextensible materials and fabricated from materials designed to withstand the harsh operating environment of table 4. In the embodiment of the invention depicted in the drawings, one strap 96 retains two motors 16 by being connected to tab 98 on the left motor 16 as shown in FIG. 2, under middle tab 98, over the right motor 16, and connected back to the right tab 98.

Figure 5:
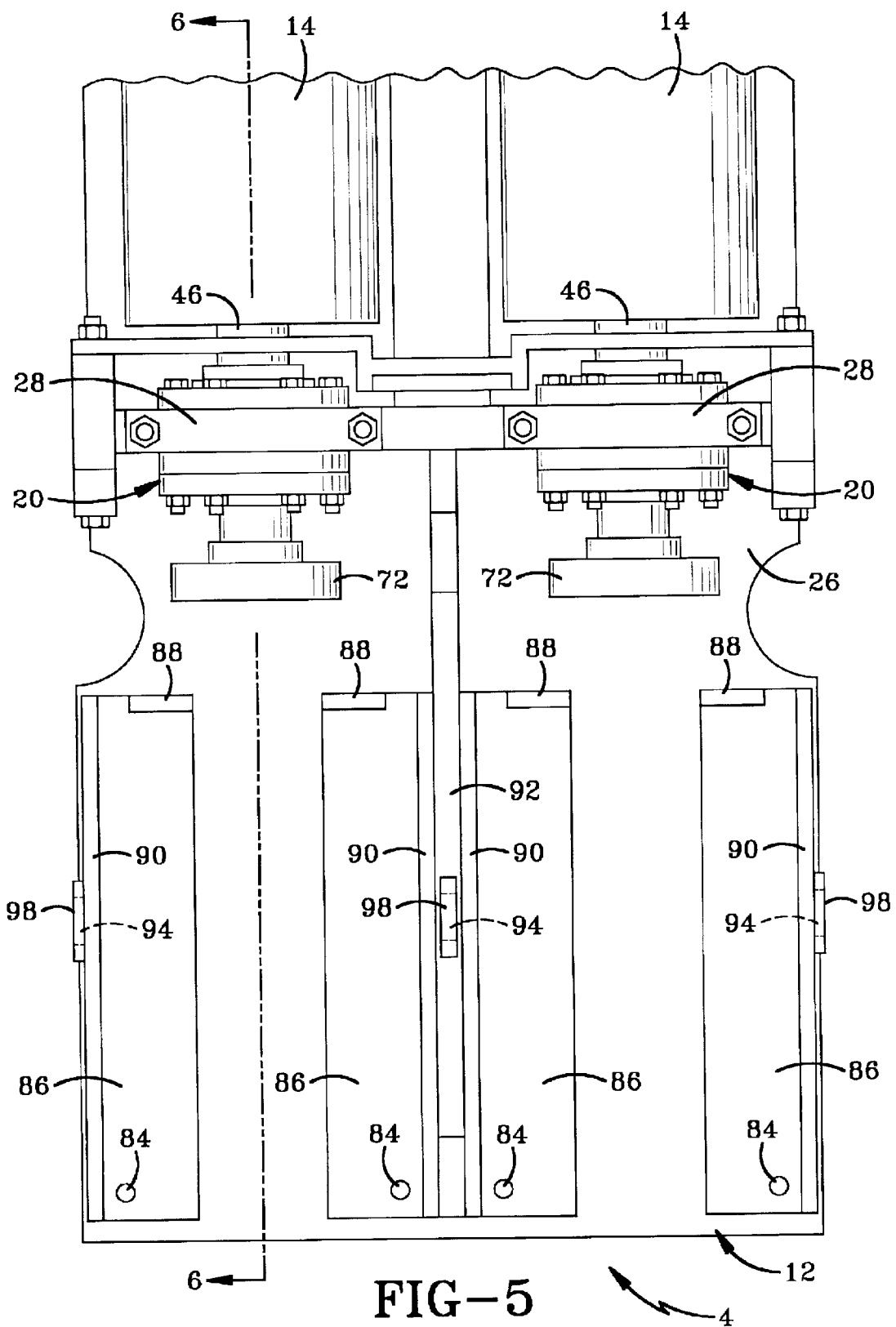
FIG. 5 is a view similar to FIG. 2 with the motors removed.
Figure 6:
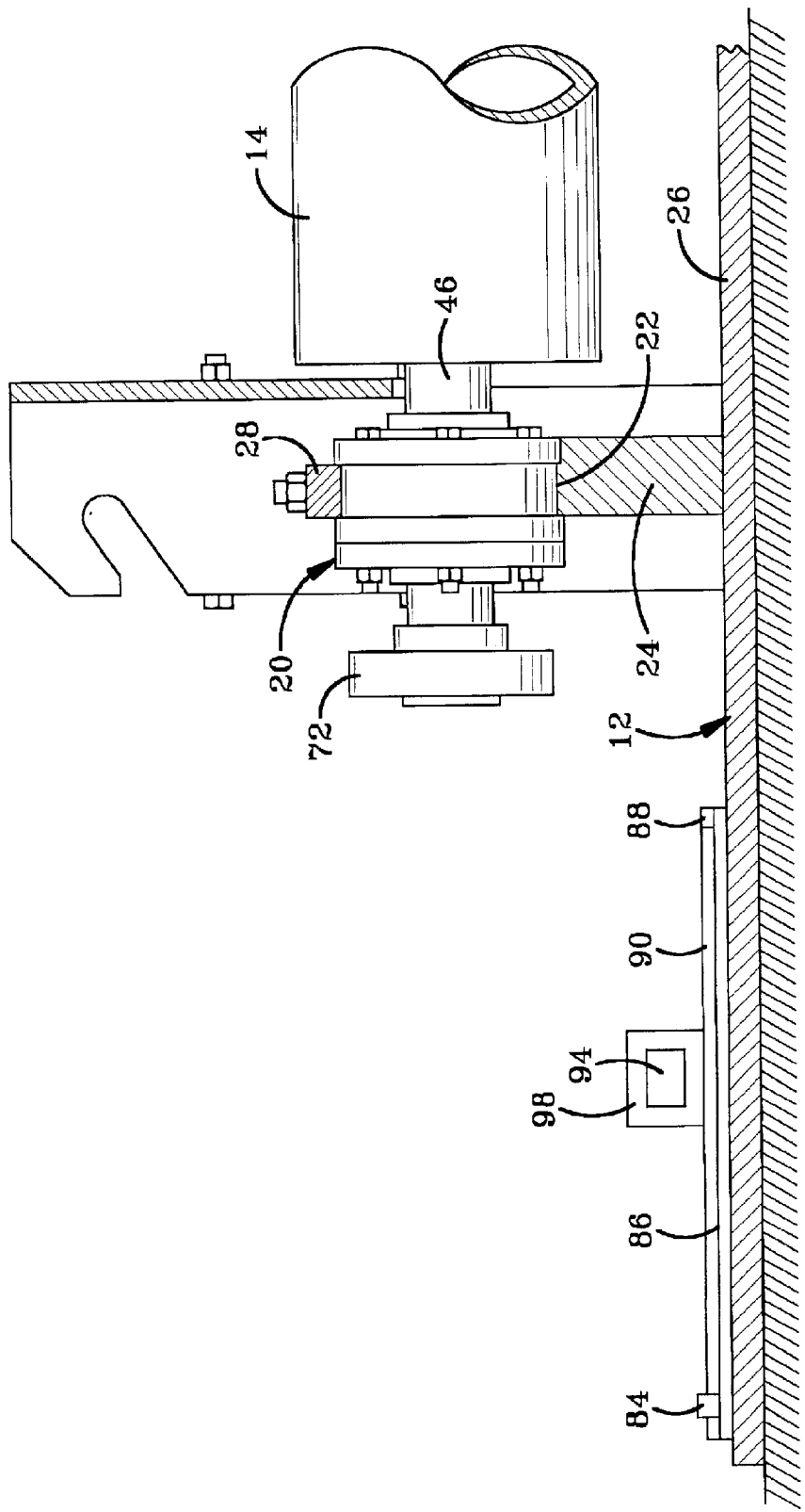
FIG. 6 is a side view of FIG. 5.
Figure 7:
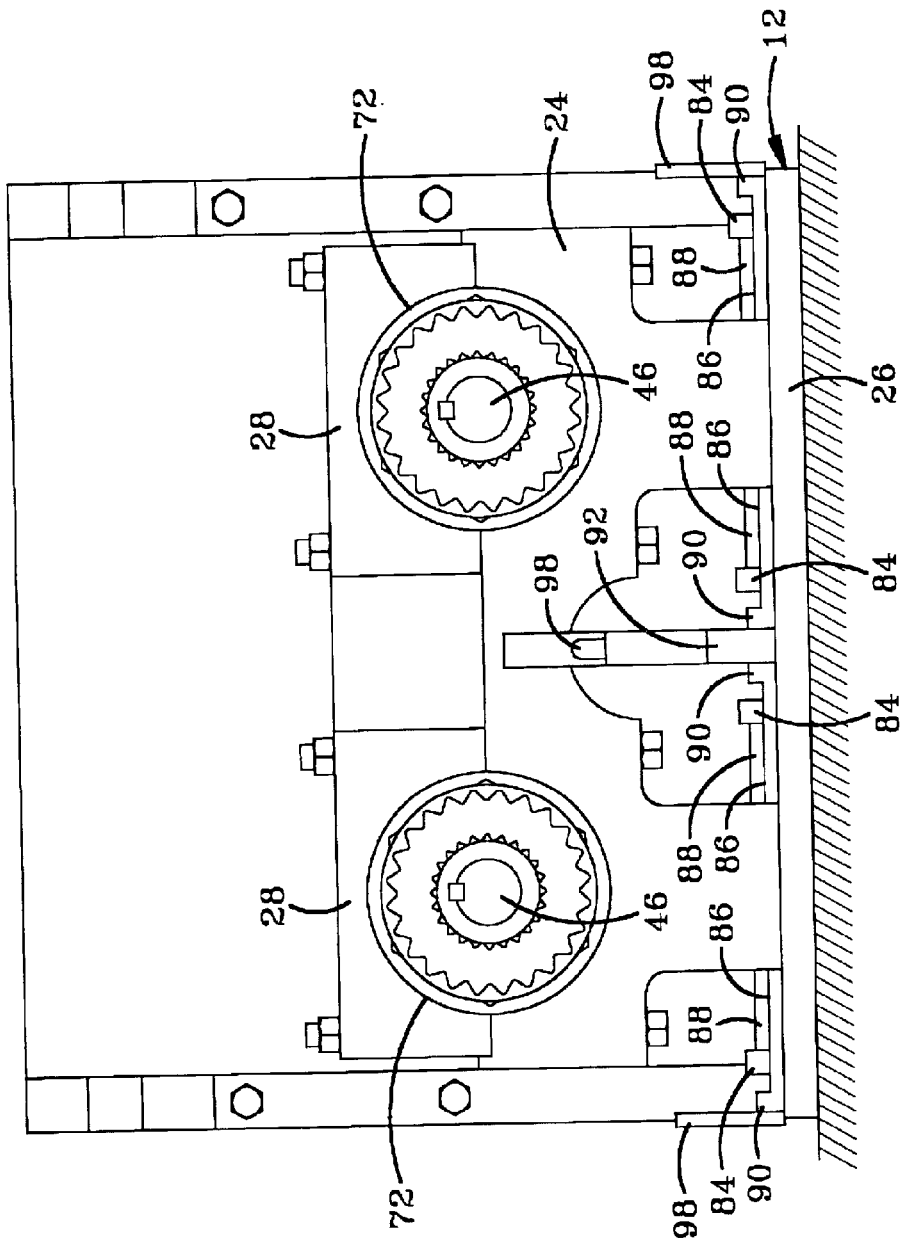
FIG. 7 is an end view of FIG. 5.
Figure 8:
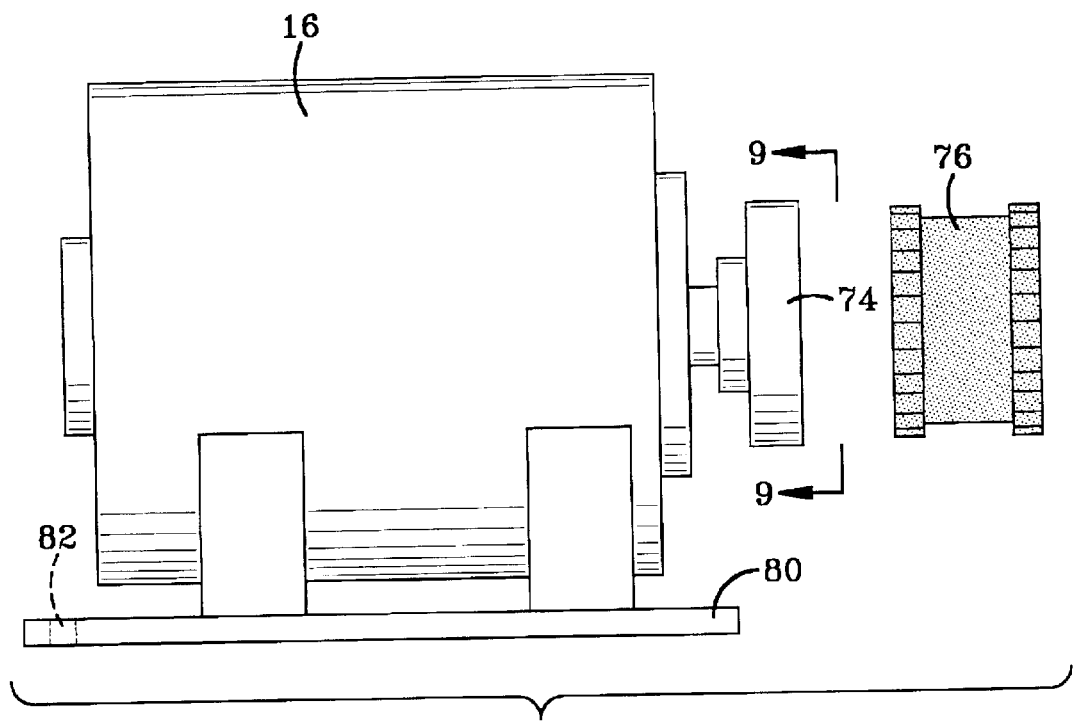
FIG. 8 is a side view of a motor showing the intermediate portion of the motor coupling removed.
Figure 9:
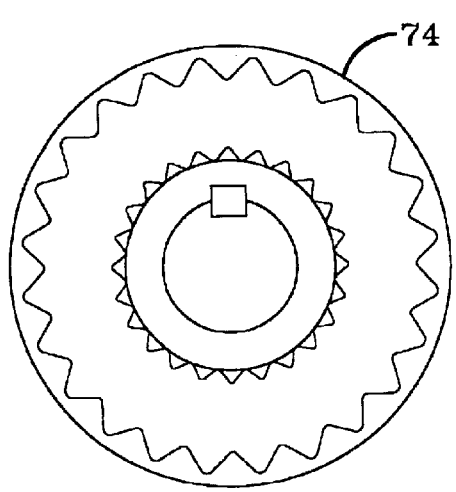
FIG. 9 is an end view taken along line 9—9 of FIG. 8.
Figure 10:
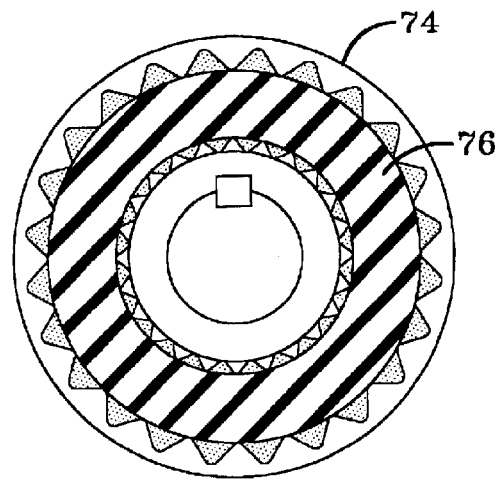
FIG. 10 is a sectional view taken through the motor coupling when the intermediate portion of the motor coupling is installed.
Figure 11:
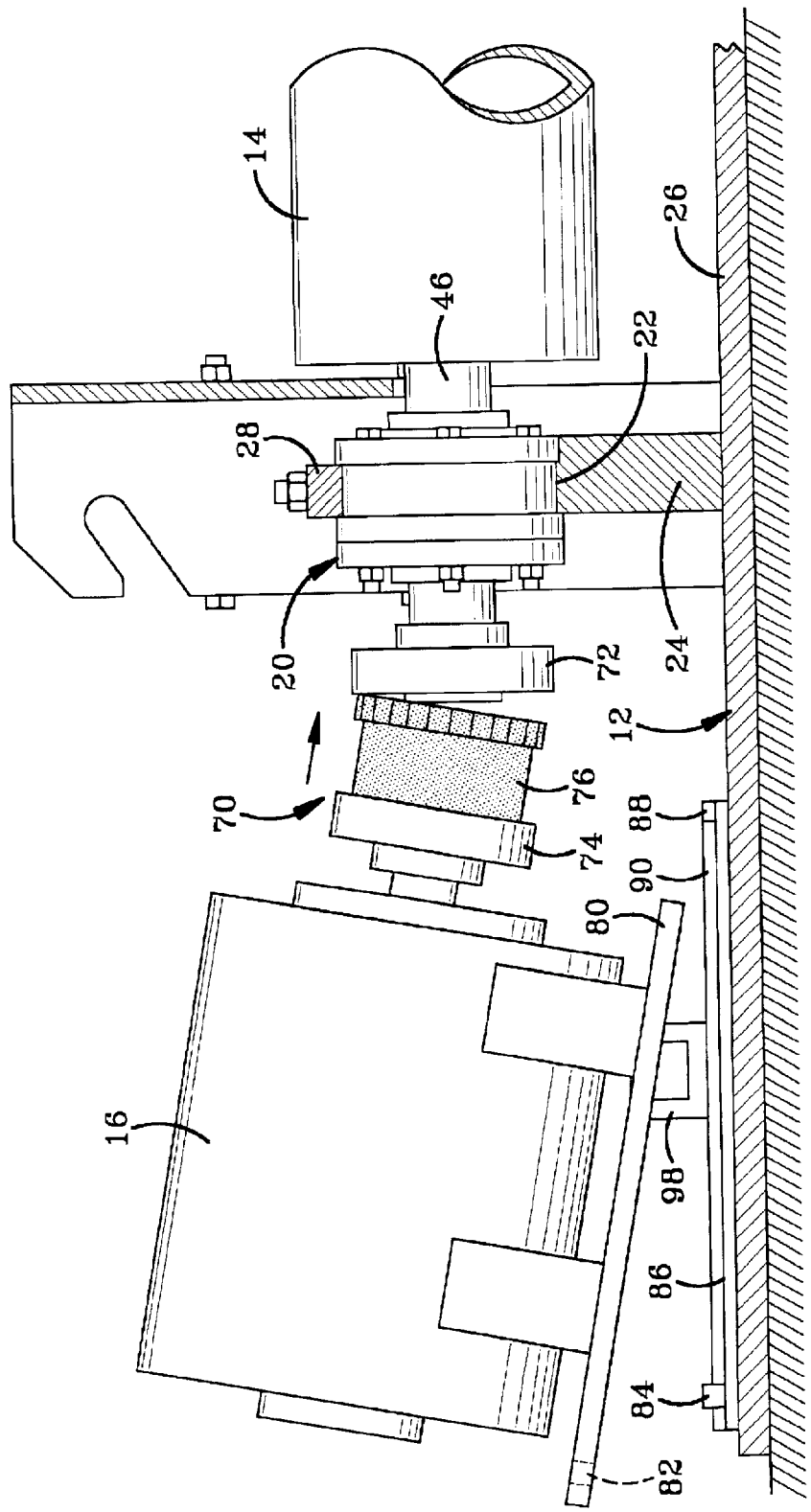
FIG. 11 is a view showing the motor being installed onto the roll out table.
Figure 14:
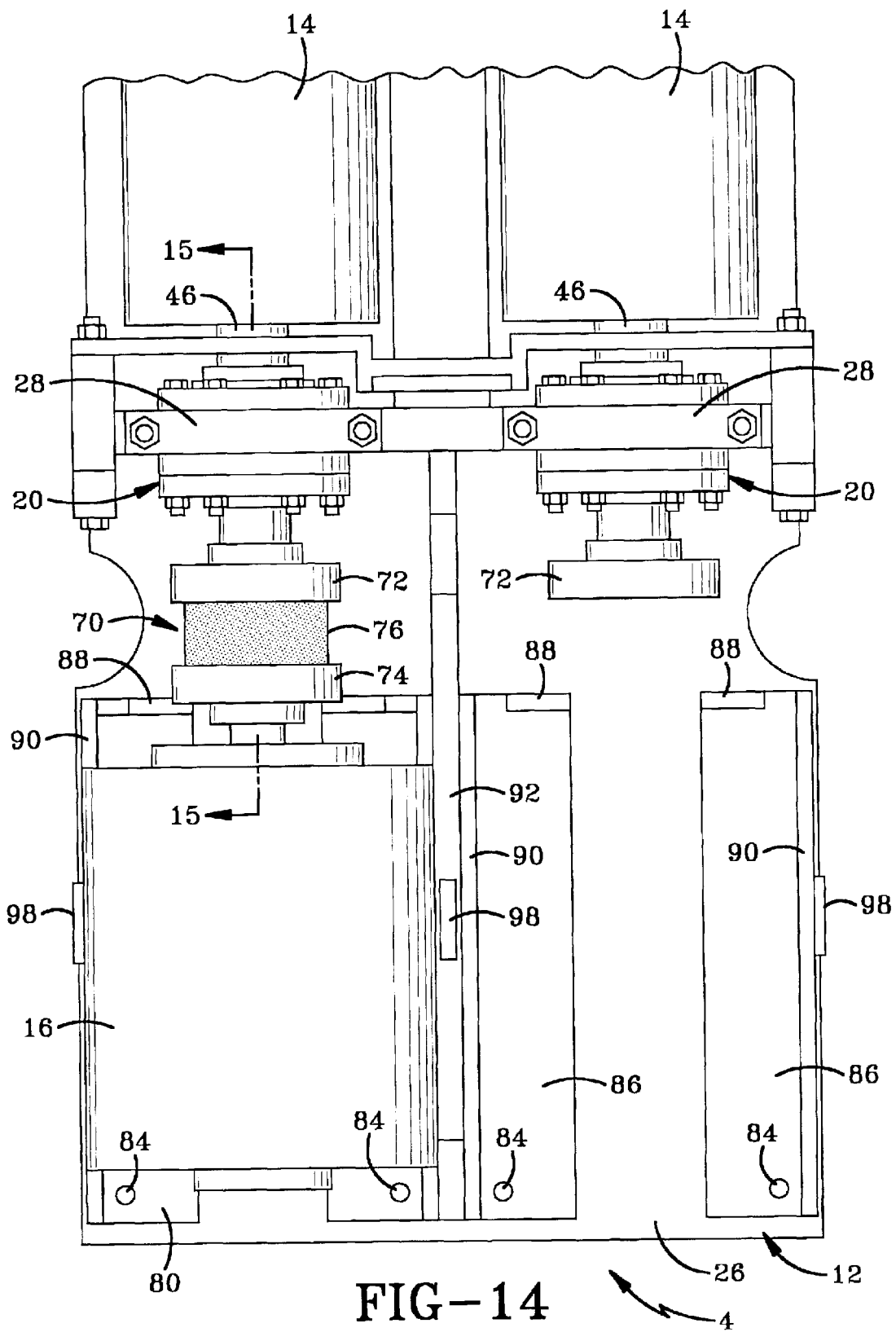
FIG. 14 is a top plan view of the motor coupling and the bearing assembly.
Figure 15:
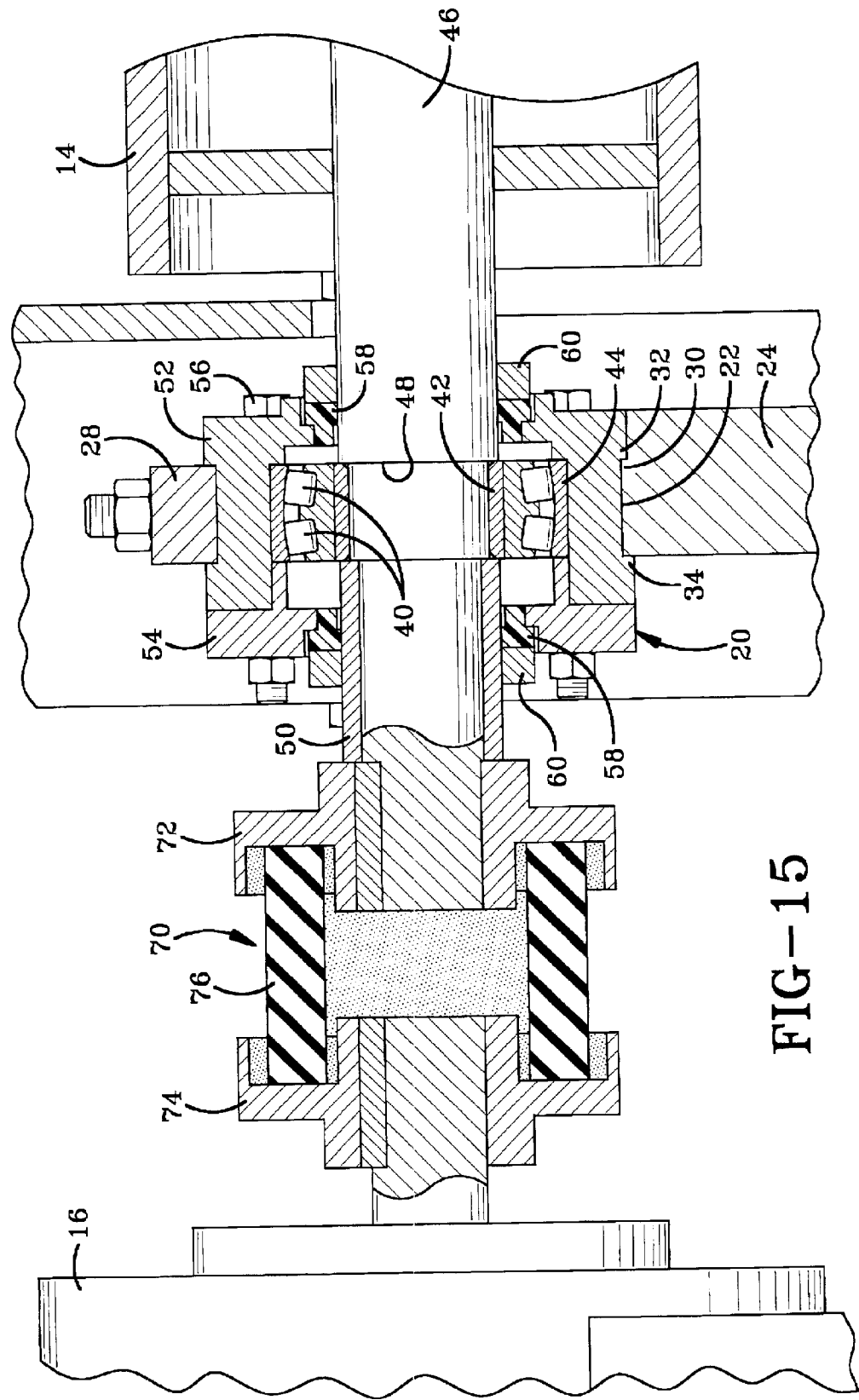
FIG. 15 is a section view taken along line 15—15 of FIG. 14.

The installation of motor 16 and coupling 70 is depicted in FIGS. 5–18. In FIG. 5, rollers 14 are installed with bearing assemblies 20. Bearing assemblies 20 may have already been taken apart and cleaned or replaced. Coupling member 72 has been attached to shaft 46 and rollers 14 are ready to receive motors 16. Intermediate coupling element 76 is placed into coupling element 74 as depicted in FIGS. 8–10. Motor 16 may then be lifted with a crane by a single user and brought into alignment with roller 14 as depicted in FIG. 11. The front of motor 16 is tilted down so that intermediate coupling element 76 may be pivoted into coupling element 72. Once coupling elements 76 and 72 are aligned, the user moves motor 16 toward coupling element 72 as indicated by the arrow shown in FIG. 11. The front edge of base 80 will eventually slide along pads 86 until it contacts stops 88. As base 80 slides along pads 86, the upper surface of studs 84 will contact the lower surface of base 80 until they align with openings 82. Base 80 will then drop down over studs 84 and motor 16 is properly positioned with respect to roller 14. This position is depicted in FIGS. 12 and 14. Once the user has installed one motor 16, the user positions strap 96 over the first motor 16 and through opening 94 defined by tab 98 between the motor mounts as depicted in FIG. 16. The free end of strap 96 is then moved out of the way so that the second motor 16 may be mounted. The second motor is mounted in the same fashion and strap 96 is wrapped over the second motor and tightened with ratchet 100 so that motors 16 cannot move upwardly away from base 12. The combination of strap 96 and studs 84 prevent motor 16 from moving out of position during operation of roll out table 4. The overall mounting process can be performed by a single user operating a small crane and can be performed in a few minutes. Motor 16 may be dismounted by reversing the process.

An existing roll out table may be retrofit for motor installation in this manner by disassembling the elements from the table and installing studs 84 at appropriate locations. Base 80 of motor 16 must be provided with openings 82 to snugly fit over studs 84 to properly position motor 16 with respect to rollers 14. Coupling 70 is installed and bearing assemblies 20 are built for rollers 14. The retrofit allows motor 16 to be quickly and easily removed and replaced. The retrofit also increases the life of the bearings because of the new configuration for bearing assemblies 20. With the retrofit configuration, the grease pumps can be eliminated and the long man hours required to remove and install motors can be eliminated. Significant benefit to this configuration is that the connections between the motor and the base and the motor and the roller do not have to be welded and cut apart as in the past.

Figure 23:
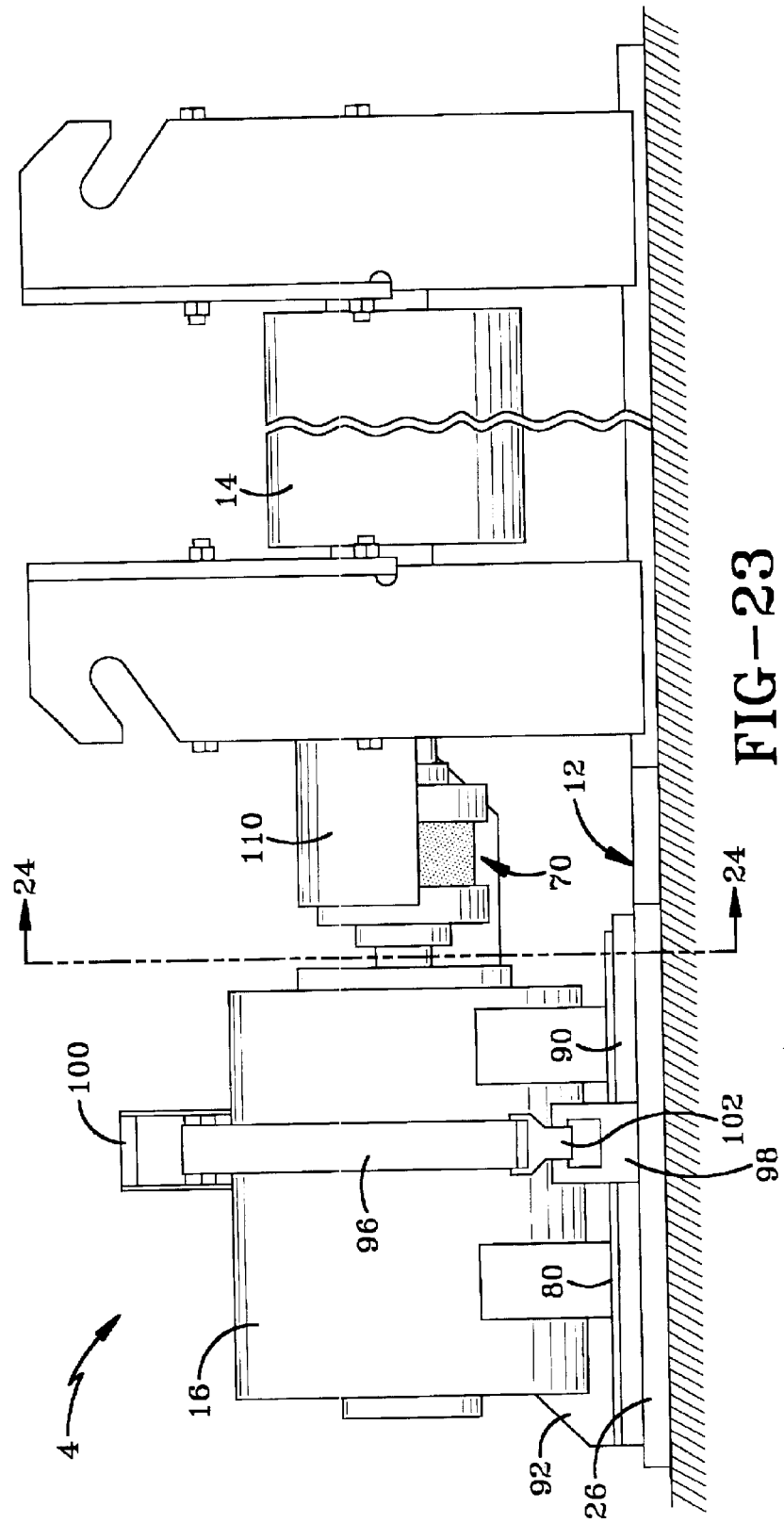
FIG. 23 is a side view of the roll out table showing a shield installed over the motor coupling.
Figure 24:
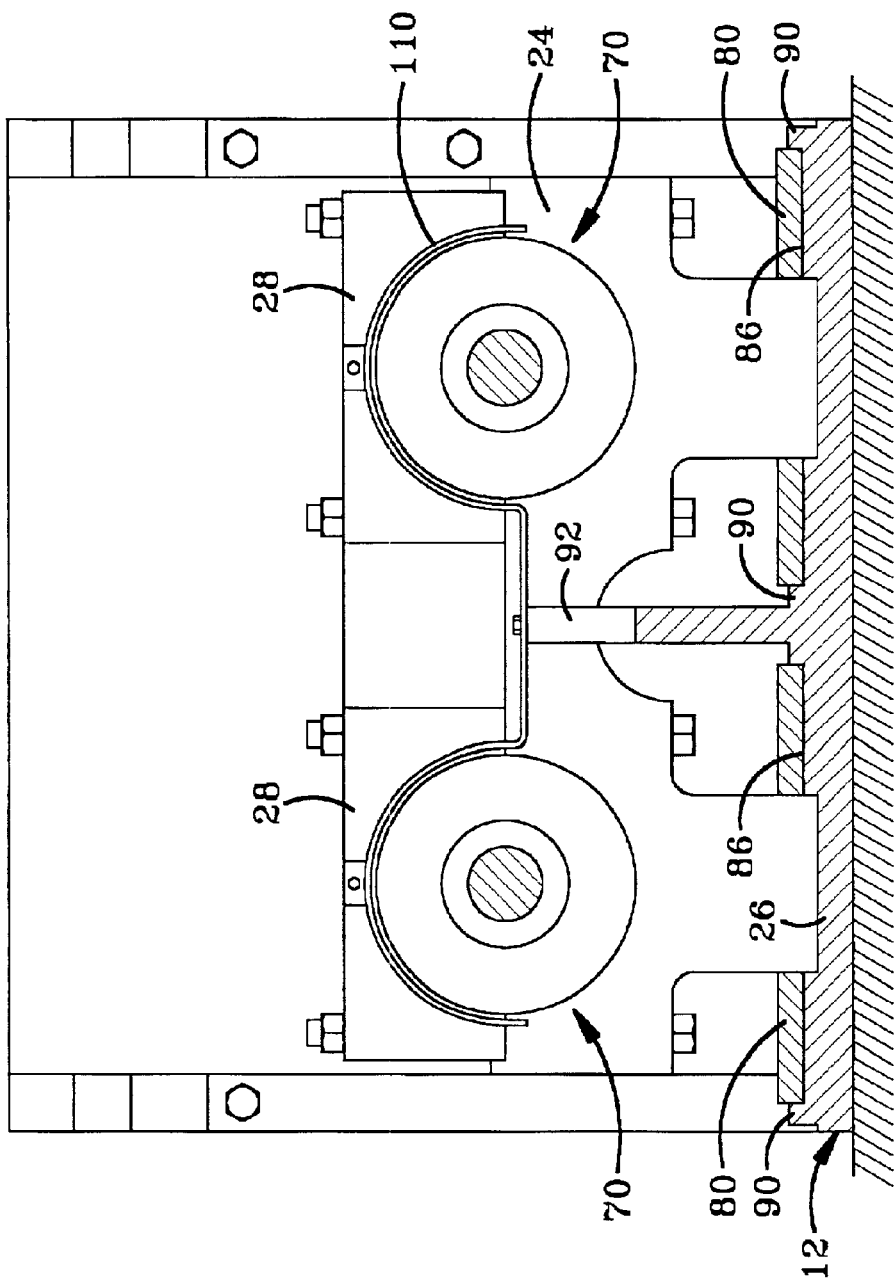
FIG. 24 is a section view taken along line 24—24 of FIG. 23.

In FIGS. 23 and 24, a shield 110 is positioned over coupling 70 to guard coupling 70 against the water being poured on table 4. Shield 110 may extend out from upper roller supports 28 and may be supported in a space location from couplings 70. Such shields have not been used in the past. Shield 110 will prevent a majority of water and debris from entering coupling 70 and will prevent water and debris from engaging one side of bearing assembly 20.

Figure 19:
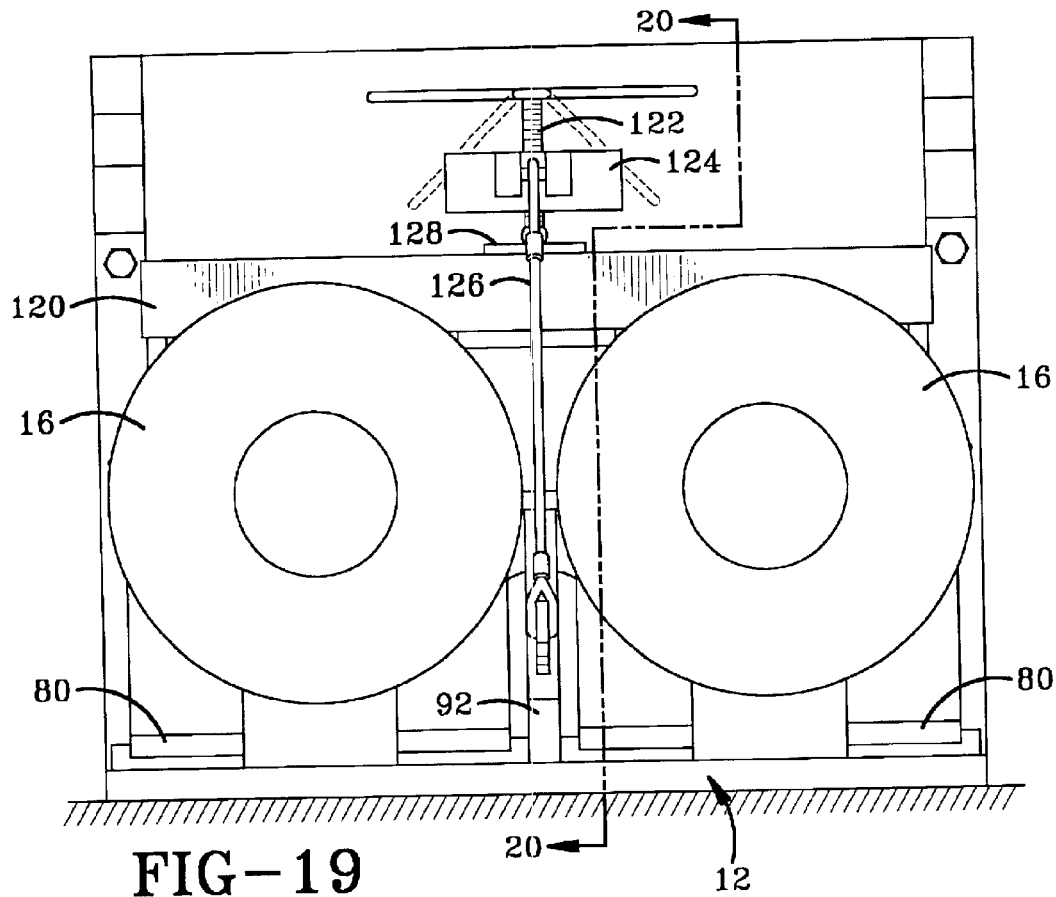
FIG. 19 is a view similar to FIG. 16 showing an alternative embodiment of the invention wherein a yoke is used to hold the motors in place.
Figure 20:
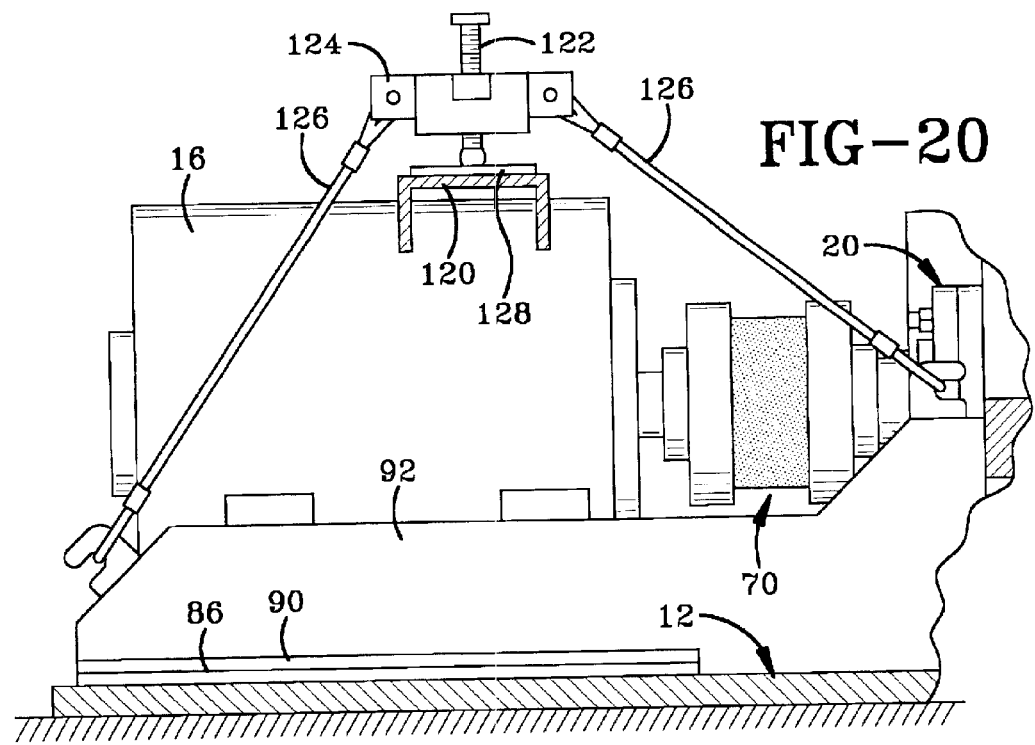
FIG. 20 is a section view taken along line 20—20 of FIG. 19.

A first alternative embodiment of the invention is depicted in FIGS. 19 and 20. In this embodiment, strap 96 is not used and a hold down device in the form of a yoke 120 is positioned above each motor 16 to hold motors 16 in place. Yoke 120 is clamped down onto motors 16 by a threaded rod 122 that threadedly engages a block 124. Block 124 is connected to base 12 by appropriate connectors such as cables 126. Yoke 120 is thus pushed down against motor 16 when threaded rod 122 is rotated with respect to block 124. Such rotation creates tension in cables 126 and pushes the foot 128 of threaded rod 122 down against yoke 120.

Figure 21:
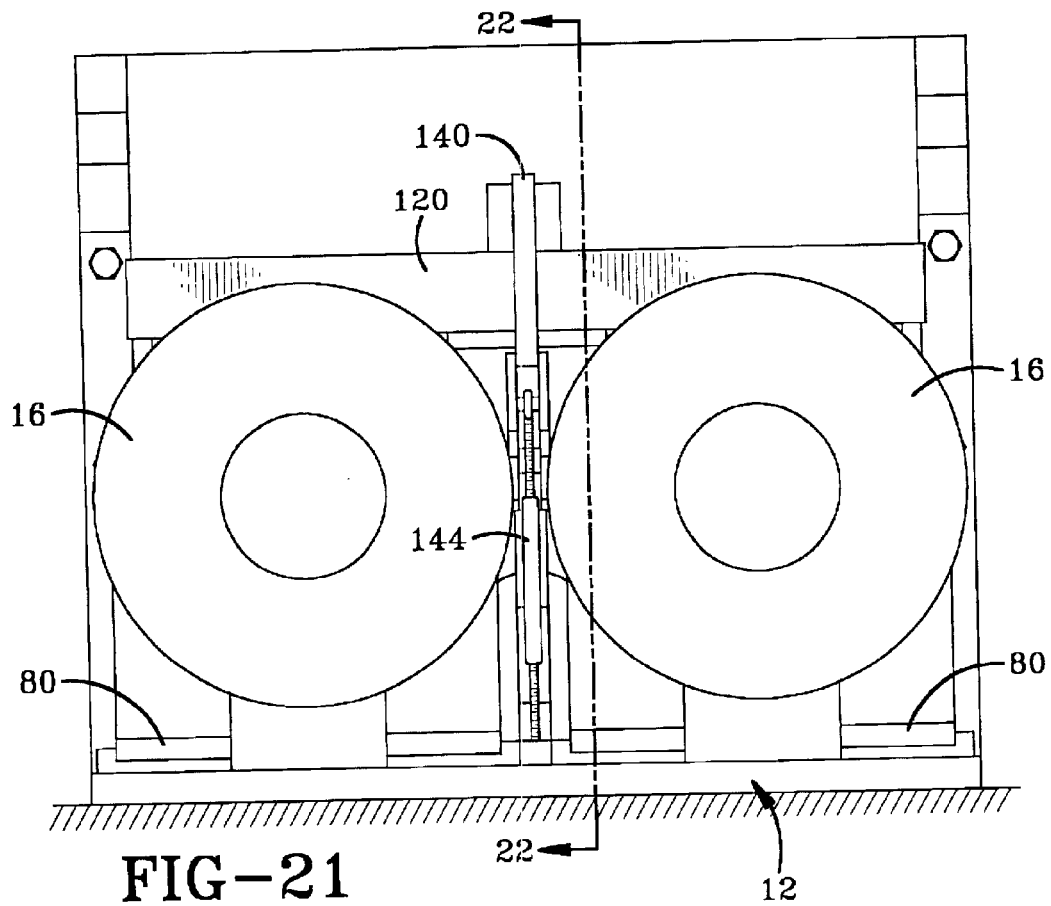
FIG. 21 is a view similar to FIG. 19 showing a second alternative embodiment of the invention.
Figure 22:
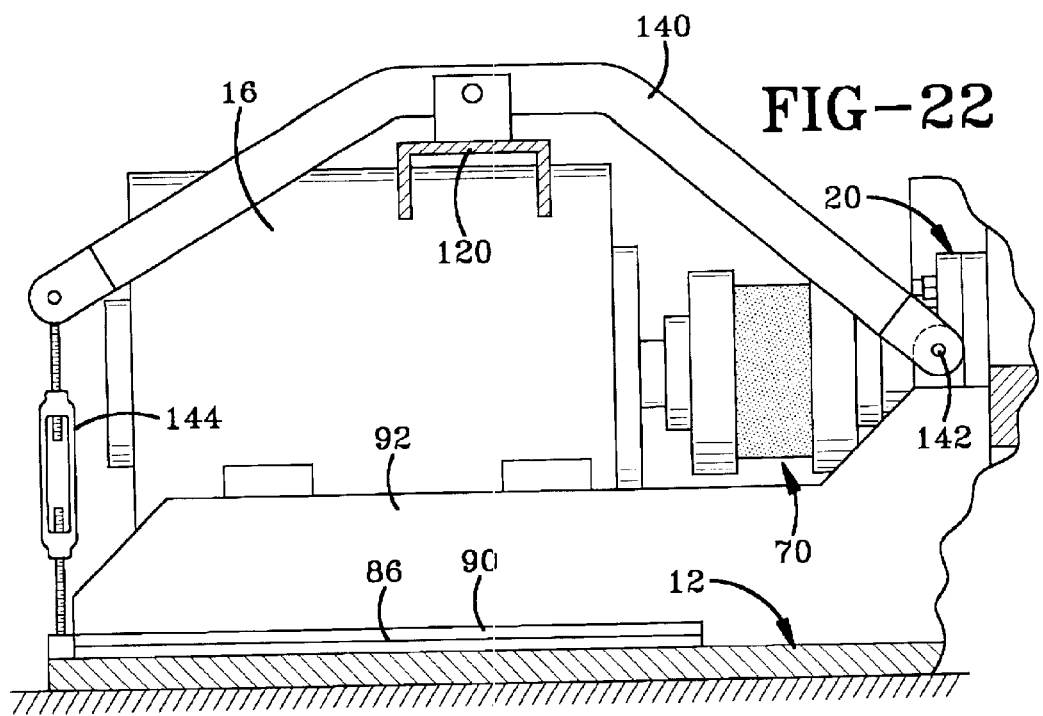
FIG. 22 is a section view taken along line 22—22 of FIG. 21.

A second alternative embodiment of the invention is depicted in FIGS. 21 and 22 wherein the hold down device is in the form of a yoke 120 that is clamped down onto motors 16 by a rod 140 that is pivoted at one end by a first pivot 142 and is threadably connected by a turn buckle 144 at its other end. FIG. 22 shows the locked position of yoke 120. Motor 16 may be clamped more securely by tightening turn buckle 144. Yoke 120 may be removed by loosening turn buckle 144 and pivoting rod 140 upwardly away from motors 16.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A powered roll out table for moving items; the roll out table comprising:
   a base;
   a first roller rotatably supported on the base;
   a first motor connected to the first roller such that the first motor may drive the first roller; the first motor having a motor base seated on the base;
   a hold down device positioned over the motor; and
   the hold down device being movable between holding and released positions with respect to the motor; the holding position of the hold down device holding the first motor against the base when the first motor is driving the first roller, the released position of the hold down device allowing the motor to be removed from the base.

2. The roll out table of claim 1, wherein the hold down device includes a flexible strap disposed over the motor.

3. The roll out table of claim 2, further comprising a ratchet connected to the flexible strap; the ratchet being adapted to adjust the length of the strap to tighten the strap against the first motor.

4. The roll out table of claim 1, wherein the hold down device includes a yoke disposed over the motor.

5. A powered roll out table for moving items; the roll out table comprising:
   a base;
   a first roller rotatably supported on the base;
   a first motor connected to the first roller such that the first motor may drive the first roller;
   a hold down device positioned over the motor;
   the hold down device being movable between holding and released positions with respect to the motor; the holding position of the hold down device holding the first motor against the base when the first motor is driving the first roller; the released position of the hold down device allowing the motor to be removed from the base;
   the first motor having a first motor base that defines at least one stud opening;
   at least one positioning stud connected to the base; and
   the positioning stud being disposed in the stud opening of the first motor base.

6. The roll out table of claim 5, wherein the first motor base has a front end; the roll out table further comprising:
   a stop connected to the base; and
   the front end of the motor base abutting the stop.

7. The roll out table of claim 6, wherein the first motor base has an edge; the roll out table further comprising:
   an edge stop connected to the base; and
   the edge of the motor base abutting the edge stop.

8. The roll out table of claim 6, wherein the first motor base has a rear end; the stud opening being positioned adjacent tile rear end of the first motor base.

9. The roll out table of claim 6, wherein the first motor base defines at least two stud openings; the rail out table further comprising:
   at least two positioning studs connected to the base; and
   the positioning studs being disposed in the stud openings of the first motor base.

10. The roll out table of claim 5, wherein the hold down device includes a yoke disposed over the first motor.

11. The roll out table of claim 10, wherein the yoke is pivotally connected to the base.

12. The roll out table of claim 10, wherein the hold down device includes a block connected to the base and a threaded rod that threadably engages the block; the threaded rod engaging the yoke to hold the yoke against the first motor.

13. A powered roll out table for moving items; the roll out table comprising:
   a base;
   a first roller rotatably supported on the base;
   a first motor connected to the first roller such that the first motor may drive the first roller;
   a hold down device positioned over the motor;
   the hold down device being movable between holding and released positions with respect to the motor; the holding position of the hold down device holding the first motor against the base when the first motor is driving the first roller; the released position of the hold down device allowing the motor to be removed from the base; and
   the hold down device including a flexible strap disposed over the first motor; the flexible strap being connected to the base.

14. The roll out table of claim 13, wherein the hold down device includes a ratchet adapted to the adjust the length of the strap to tighten the strap against the first motor.

15. The roll out table of claim 13, further comprising a shield positioned over the connection between the first motor and the first roller.

16. The roll out table of claim 15, further comprising an adjustable coupling forming the connection between the first motor and the first roller.

17. The roil out table of claim 13, wherein the first motor has a first motor base that defines at least one stud opening;
   at least one positioning stud connected to the base; and
   the positioning stud being disposed in the stud opening of the first motor base.

18. The roil out table of claim 17, wherein the first motor base has a front end and an edge; the roll out table further comprising:
   a stop connected to the base;
   the front end of the motor base abutting the stop; and
   an edge stop connected to the base; the edge of the motor base abutting the edge stop.

19. The roll out table of claim 13, further comprising at least one bearing assembly rotatably supporting the first roller on the base; and a first slinger disposed adjacent the bearing assembly.

20. A powered roll out table for moving items; the roll out table comprising:
   a base;
   a first roller rotatably supported on the base;
   a first motor connected to the first roller such that the first motor may drive the first roller;
   a hold down device positioned over the motor;
   the hold down device being movable between holding and released positions with respect to the motor; the holding position of the hold down device holding the first motor against the base when the first motor is driving the first roller; the released position of the hold down device allowing the motor to be removed from the base; and
   at least one bearing assembly rotatably supporting the first roller on the base; and a first slinger disposed adjacent the bearing assembly.

21. The roll out table of claim 20, further comprising a second slinger disposed adjacent the bearing assembly; the bearing assembly being disposed intermediate the first and second slingers.

22. The roll out table of claim 20, wherein the hold down device includes a flexible strap disposed over the motor.

23. The roll out table of claim 20, wherein the hold down device includes a yoke disposed over the motor.

24. A powered roll out table for moving items; the roll out table comprising:
   a base;
   first end second rollers rotatably supported on the base; the first and second rollers disposed substantially parallel to and adjacent to each other;
   a first motor connected to the first roller such that the first motor may drive the first roller;
   a second motor connected to the first roller such that the first motor may drive the first roller;
   the first and second motors being disposed adjacent to each other; a hold down device positioned over the first and second motors;
   the hold down device being movable between holding and released positions with respect to the first and second motors; the holding position of the hold down device holding the first and second motors against the base when the first and second motors are driving the rollers; the released position of the hold down device allowing the motors to be removed from the base; and
   the hold down device including a flexible strap disposed over the first and second motors; the flexible strap being connected to the base.

25. The roll out table of claim 24, wherein the strap is slidably connected to the base intermediate the first and second motors.

26. The roll out table of claim 25, wherein the hold down device includes a ratchet adapted to the adjust the length of the strap to tighten the strap against the motors.

27. The roll out table of claim 24, wherein each motor has a motor base that defines at least one stud opening; each motor base having front and rear ends and an edge; the roll out table further comprising:
   at least two positioning studs connected to the base;
   one positioning stud being disposed in the stud opening of each motor bass;
   at least one stop connected to the base;
   the front end of each motor base abutting the at least one stop;
   edge stops connected to the base; and
   the edge of each motor base abutting one of the edge stops.

28. The roll out table of claim 27, wherein the motor bases are disposed intermediate the edge stops.

29. The roll out table of claim 28, further comprising a pair of edge stops connected to the base for each motor base; each motor base being disposed intermediate the edge stops.

30. A method for changing a motor on a roll out table wherein the existing motor is connected to the roll out table with a hold down device disposed over the top of the existing motor; the hold down device holding the existing motor base of the motor on a positioning stud; the roll out table including a roller connected to the motor with a coupler; the method comprising the steps of:
   moving the hold down device to a released position with respect to the motor;
   lifting the existing motor from the positioning studs;
   sliding the existing motor out of the coupler;

sliding a new motor into the coupler; the new motor having a motor base that defines stud openings;

positioning the motor base of the new motor with the studs disposed in the stud openings of the motor base; and positioning a portion of the hold down device over the top of the new motor and moving the hold down device to a holding position over the top of the motor to hold the new motor in position against the motor base.

31. The method of claim 30, wherein the steps of moving the hold down device are free of the steps of using bolts.

32. A method for retrofitting a motor mount on a roll out table wherein the existing roll out table includes a base, a motor bolted to the base, and a roller connected to the motor; the method comprising the steps of:

removing the existing motor from the base;

connecting positioning studs to the base of the table;

forming stud receiving openings in a motor base of a motor;

positioning the motor on the base with the studs received in the stud receiving openings of the motor base; and providing a hold down device disposed over the motor to hold the motor in position on the base of the table; the hold down device having a holding position over top of the motor that holds the motor down against the base; the hold down device also having a released position that allows the motor to be removed from the base.

33. The method of claim 32, further comprising the steps of:

adding positioning stops to the base of the table; and abutting the motor base with the positioning stops when the positioning studs are received in the stud receiving openings.

34. The method of claim 32, further comprising the step of tightening the hold down device on the motor.

35. The method of claim 32, further comprising the step of installing an adjustable coupling between the motor and the roller.

36. The method of claim 32, further including the step of providing the hold down device in the form of a flexible strap disposed over the motor.

37. The method of claim 32, further including the step of providing the hold down device in the form of a yoke disposed over the motor.

* * * * *